United States Patent
Jahankhani (10) Patent No.: US 9,886,477 B2
(45) Date of Patent: Feb. 6, 2018

(54) GENERATING IMPERATIVE-LANGUAGE QUERY CODE FROM DECLARATIVE-LANGUAGE QUERY CODE

(71) Applicant: Saeed Jahankhani, Vancouver (CA)

(72) Inventor: Saeed Jahankhani, Vancouver (CA)

(73) Assignee: SAP SE, Walldorf (DE)

(*) Notice: Subject to any disclaimer, the term of this patent is extended or adjusted under 35 U.S.C. 154(b) by 486 days.

(21) Appl. No.: 14/523,832

(22) Filed: Oct. 24, 2014

(65) Prior Publication Data

US 2016/0117364 A1 Apr. 28, 2016

(51) Int. Cl.
*G06F 17/30* (2006.01)

(52) U.S. Cl.
CPC .... *G06F 17/30427* (2013.01); *G06F 17/3041* (2013.01)

(58) Field of Classification Search
CPC ............... G06F 17/30427; G06F 17/3041
USPC ............................................. 707/760
See application file for complete search history.

(56) References Cited

U.S. PATENT DOCUMENTS

| | | | | |
|---|---|---|---|---|
| 9,535,948 | B1* | 1/2017 | Cuthbert | G06F 17/30427 |
| 2003/0167261 | A1* | 9/2003 | Grust | A61K 9/0075 |
| 2006/0004827 | A1* | 1/2006 | Stuart | G06F 9/4425 |
| 2009/0077001 | A1* | 3/2009 | Macready | G06N 5/02 706/57 |
| 2009/0254881 | A1* | 10/2009 | Johnson | G06F 8/30 717/117 |
| 2012/0005190 | A1* | 1/2012 | Faerber | G06F 17/30404 707/718 |

OTHER PUBLICATIONS

Carter, "Example: A Really Simple Moving Average Window Clause," downloaded from the World Wide Web, 4 pp. (Feb. 25, 2012).
SAP NetWeaver Developer's Guide, "Moving Average Parameters," downloaded from the World Wide Web, 3 pp. (document downloaded on Oct. 29, 2014).
SAP Visual Composer Documentation "Moving Average Parameters," downloaded from the World Wide Web, 4 pp. (document downloaded on Oct. 29, 2014).
SAP, "SAP HANA Business Function Library (BFL)," SAP HANA Platform SPS 08—Document Version: 1.1, 164 pp. (Aug. 21, 2014).
SAP, "SAP Lumira Server User Guide," SAP Lumira Server—Document Version: 1.15, 16 pp. (Mar. 25, 2014).
SAP, "SAP Lumira Server User Guide," SAP Lumira Server—Document Version: 1.20, 60 pp. (Oct. 20, 2014).

(Continued)

*Primary Examiner* — Thu-Nguyet Le
(74) *Attorney, Agent, or Firm* — Klarquist Sparkman, LLP (57) ABSTRACT

Innovations in the area of query processing for a database management system ("DBMS") are presented herein. For example, for a database query, a query engine generates query code in an imperative language (such as a procedural, scripting language) based on query code in a declarative language (such as a structured query language). The query engine can embed the imperative-language query code in an intermediate representation of the database query, which is executed by the DBMS. In many instances (e.g., for non-linear operations of a database query), the imperative-language query code can be executed by the DBMS more quickly and efficiently than the original declarative-language query code. The DBMS returns results of the execution of the database query.

20 Claims, 9 Drawing Sheets

(56) References Cited

OTHER PUBLICATIONS

SAP, "SAP Lumira User Guide," SAP Lumira—Document Version: 1.15, 85 pp. (Feb. 3, 2014).
SAP, "SAP Lumira User Guide," SAP Lumira—Document Version: 1.20, 140 pp. (Oct. 20, 2014).
Swain, "Moving Average Calculation in HANA," SAP Community Network, downloaded from the World Wide Web, 3 pp. (Jan. 6, 2014).
Wikipedia, "Declarative Programming," downloaded from the World Wide Web, 5 pp. (document marked Oct. 2014).
Wikipedia, "Imperative Programming," downloaded from the World Wide Web, 5 pp. (document marked Oct. 2014).

* cited by examiner

FIG. 1 software 180 implementing one or more innovations for generating imperative-language query code from declarative-language query code for a database query

```
{
    "version" : "2.0",
    "queries" : [{
        "rowsDim" : {
            "axisType" : "categorical",
            "components" : [{
                "key" : {
                    "id" : "BP_COUNTRY"
                },
                "id" : "ENTITY_ID_BP_COUNTRY",
                "analyticType" : "dimension",
                "sorting" : {
                    "id" : "ENTITY_ID_BP_COUNTRY",
                    "attributeId" : "BP_COUNTRY",
                    "direction" : "ascending"
                }
            }
            ],
            "page" : 0,
            "pageSize" : 2
        },
        "cellsDim" : {
            "axisType" : "subquery",
            "components" : [{
                "marksNum" : {
                    "axisType" : "numerical",
                    "components" : [{
                        "key" : {
                            "id" : "BIGINT"
                        },
                        "id" : "ENTITY_ID_BIGINT",
                        "analyticType" : "measure",
                        "aggregationType" : "sum"
                    }, {
                        "analyticType" : "calculation",
                        "id" : "RunningAverage",
                        "key" : {
                            "id" : "RunningAverage",
                            "calculation" : {
                                "type" : "Running.Average",
                                "aggregationType" : "sum",
                                "measure" : "BIGINT",
                                "properties" : {
                                    "withEmpties" : false
                                }
                            }
                        }
                    }, {
                        "analyticType" : "calculation",
                        "id" : "RunningSUM",
                        "key" : {
                            "id" : "RunningSUM",
                            "calculation" : {
                                "type" : "Running.Sum",
                                "aggregationType" : "sum",
                                "measure" : "BIGINT"
                            ...
```

FIG. 6b
600

```
                    . . .
                            }
                        }
                    }
                ]
            },
            "marksXDim" : {
                "axisType" : "categorical",
                "components" : [{
                        "key" : {
                                "id" : "BP_FSTNAME"
                        },
                        "id" : "ENTITY_ID_BP_FSTNAME",
                        "analyticType" : "dimension",
                        "sorting" : {
                                "id" : "ENTITY_ID_BP_FSTNAME",
                                "attributeId" : "BP_FSTNAME",
                                "direction" : "ascending"
                        }
                }
                ],
                "groupForRangeCalculations" : true
            }
        }
        ]
    }
    }
  ]
}
```

FIG. 7a 700

```
Bool isContextMatch(Table parent, Table child, Size parentIndex, Size childIndex) {
    Bool match = Bool(true);
    if ((parent.getNumberOfColumns() == 0z || parent.getSize() < parentIndex ||
child.getSize() < childIndex)) {
        match = Bool(false);
    } else {
        match = (match && Bool(parent.getColumn < NullString > ("BP_COUNTRY")[parentIndex]
== child.getColumn < NullString > ("BP_COUNTRY")[childIndex]));
    }
    return match;
}
export Void main(Table < NullString "BP_COUNTRY", NullString "BP_FSTNAME", NullFixed8 < 0 >
"BIGINT" > "Q0_L1_V9_QUERY_GA" child, Table < NullString "BP_COUNTRY", NullString
"BP_FSTNAME", NullFixed8 < 0 > "BIGINT", NullFixed8 < 0 > "RunningSUM_CID_151916941",
NullDecFloat34 "MyCalculationId_CID_521170392" > "RESULT" & outData, Table < NullString
"BP_COUNTRY" > "Q0_L0_V1_QUERY_GA" parent) {
    Size parentCursor = 0z;
    Size childCursor = 0z;
    Size parentMax = parent.getSize();
    Size childMax = child.getSize();

if (childMax == 0z) {
        return;
    }
    outData.addColumn(child."BP_COUNTRY");
    outData.addColumn(child."BP_FSTNAME");
    outData.addColumn(child."BIGINT");

outData."RunningSUM_CID_151916941".setElementRange(childCursor, childMax, NullFixed8 < 0
> ());
    outData."MyCalculationId_CID_521170392".setElementRange(childCursor, childMax,
NullDecFloat34());

NullFixed8 < 0 > var_RunningSUM_CID_151916941 = NullFixed8 < 0 > ("0");
    NullInt32 var_CID_16318498 = NullInt32("0");
    NullDecFloat34 var_MyCalculationId_CID_521170392 = NullDecFloat34();

Bool skipParent = parentMax == 0z;
    while ((skipParent || parentCursor < parentMax)) {
        while ((childCursor < childMax && (skipParent || isContextMatch(Table(parent),
Table(child), parentCursor, childCursor)))) {
            NullFixed8 < 0 > child_BIGINT = child."BIGINT"[childCursor];

if (!child_BIGINT.isNull()) {
                var_RunningSUM_CID_151916941 = var_RunningSUM_CID_151916941 + child_BIGINT;
            }
            if (!child_BIGINT.isNull()) {
                var_CID_16318498 = var_CID_16318498 + NullInt32("1");
            }
            if ((!var_CID_16318498.isNull() && var_CID_16318498 != NullInt32("0"))) {
                var_MyCalculationId_CID_521170392 =
math::round(NullDecFloat34(var_RunningSUM_CID_151916941) / NullDecFloat34(var_CID_16318498),
3);
            } else {
                var_MyCalculationId_CID_521170392 = NullDecFloat34();
            }
                                . . .
```

```
        outData."RunningSUM_CID_151916941"[childCursor] = var_RunningSUM_CID_151916941;
        outData."MyCalculationId_CID_521170392"[childCursor] =
var_MyCalculationId_CID_521170392;

childCursor = childCursor.next();

}
    if (skipParent) {
        break;
    }
    var_RunningSUM_CID_151916941 = NullFixed8 < 0 > ("0");
    var_CID_16318498 = NullInt32("0");
    var_MyCalculationId_CID_521170392 = NullDecFloat34();

parentCursor = parentCursor.next();

```
[{
    "dimAxes" : {
        "rowsDim" : {
            "values" : [[0], [1]],
            "count" : 95
        },
        "cellsDim" : [{
            "marksXDim" : {
                "values" : [],
                "count" : 946
            }
        }
        ]
    },
    "ranges" : {
        "cellsDim" : [{
            "marksNum" : [{
                    "min" : 42920063036290,
                    "max" : 21472741877176172,
                    "maxSumPositive" : 21472741877176172,
                    "minSumNegative" : 0
                }, {
                    "min" : 131199550462522,
                    "max" : 1435626638432572,
                    "maxSumPositive" : 1435626638432572,
                    "minSumNegative" : 0
                }, {
                    "min" : 131199550462522,
                    "max" : 10465268375134499900,
                    "maxSumPositive" : 10465268375134499900,
                    "minSumNegative" : 0
                }
            ]
        }
        ]
    },
    "valueAxes" : [{
        "rowsDim" : 0,
        "cellsDim" : [{
            "dimAxes" : {
                "marksXDim" : {
                    "values" : [[2]],
                    "count" : 1
                }
            },
            "valueAxes" : [{
                "marksXDim" : 0,
                "marksNum" : [139914937450662, 139914937450662,
                              139914937450662]
            }
            ]
        }
        ]
    }, {
        "rowsDim" : 1,
        "cellsDim" : [{
                       . . .
```

```
                    ...
                    "dimAxes" : {
                        "marksXDim" : {
                            "values" : [[0], [1]],
                            "count" : 2
                        }
                    },
                    "valueAxes" : [{
                            "marksXDim" : 0,
                            "marksNum" : [156117507078582, 156117507078582,
                                            156117507078582]
                        }, {
                            "marksXDim" : 1,
                            "marksNum" : [157364765946496, 156741136512539,
                                            313482273025078]
                        }
                    ]
                }
            ]
        }
    ],
    "metadata" : {
        "dictionary" : {
            "rowsDim" : [{
                    "value" : ["Alsace", "Aquitaine"],
                    "id" : "ENTITY_ID_BP_COUNTRY",
                    "hasCompositeKey" : false
                }
            ],
            "cellsDim" : [{
                    "marksXDim" : [{
                            "value" : ["Gerard", "Henri", "Thomas"],
                            "id" : "ENTITY_ID_BP_FSTNAME",
                            "hasCompositeKey" : false
                        }
                    ],
                    "marksNum" : ["ENTITY_ID_BIGINT", "RunningAverage", "RunningSUM"]
                }
            ]
        }
    },
    "executionStatus" : {
        "status" : "ok"
    }
  }
]
```

GENERATING IMPERATIVE-LANGUAGE QUERY CODE FROM DECLARATIVE-LANGUAGE QUERY CODE

REFERENCE TO COMPUTER PROGRAM LISTINGS

Submitted electronically herewith in ASCII text file format is a computer program listing for a file entitled CreatesLProcedure.txt. The file CreatesLProcedure.txt was created on Oct. 24, 2014, and has a size of 33,468 bytes. The disclosure of the file CreatesLProcedure.txt is incorporated by reference. Below, the file CreatesLProcedure.txt is also called Appendix 1. Also submitted electronically herewith in ASCII text file format is a computer program listing for a file entitled CalculationScenario.txt. The file CalculationScenario.txt was created on Oct. 24, 2014, and has a size of 39,910 bytes. The disclosure of the file CalculationScenario.txt is incorporated by reference. Below, the file CalculationScenario.txt is also called Appendix 2.

FIELD

Query processing for a database management system.

BACKGROUND

In general, a database is an organized collection of data. A relational database, conceptually, can be organized as one or more tables, where a table is a two-dimensional structure with data values organized in rows and columns A row of a table contains the data values for one record of the table. A column of the table contains the data values of one field of the table across multiple records (rows) of the table. A database management system ("DBMS") mediates interactions between a database, users and applications in order to organize, create, update, capture, analyze and otherwise manage the data in the database.

Some DBMSs implement column-oriented storage of data in a database. A database that uses column-oriented storage is a column-store database. A column-store database can include one or more tables. In a column-store database, a table of data is partitioned into separate columns, and the values of each column are stored contiguously in storage or memory. The columns of a table typically have the same length (number of records, or rows). The columns are independent, in that a column does not necessarily have to be written directly after the column that precedes it in the table. Column-oriented storage is efficient when aggregating values in a single column. Column-oriented storage also facilitates compression. On the other hand, inserting a new record, selecting a whole record, or processing data values on a record-after-record basis in a column-store database involves writing or reading values in multiple columns, which can be inefficient.

In many scenarios, data stored in a database can be accessed using a client application. For example, a client application transforms user input from a data analyst into queries issued to the DBMS managing the database. Typically, a database query is written in a database query language such as a structured query language ("SQL"). SQL is a special-purpose language designed for manipulation of data managed by a DBMS. SQL is an example of a declarative language. (In general, a declarative language specifies what a computer program should accomplish, without specifying how to accomplish it as a sequence of steps or actions. In contrast, an imperative language specifies a computer program as statements that change the program's state, using an explicit sequence of steps or actions.) A DBMS receives a database query from a client application, processes the database query and returns results of the database query to the client application. When it processes the database query, the DBMS can generate an intermediate representation of the database query, which specifies operations for retrieval and transformation of data responsive to the database query, then execute the intermediate representation of the database query.

For a column-store database, a database query can define an operation (a so-called linear operation) performed on one or more columns of data, on a column-after-column basis. A database query can also define an operation (a so-called non-linear operation) performed on one or more rows of data, on a row-after-row basis. Linear operations and non-linear operations can easily be specified in SQL. When a DBMS processes a database query, performing linear operations specified in SQL is typically fast and efficient, but performing non-linear operations specified in SQL can be slow and inefficient.

SUMMARY

In summary, the detailed description presents innovations in the area of query processing for a database management system ("DBMS"). For example, for a database query, a query engine generates query code in an imperative language based on query code in a declarative language. In many instances (e.g., for non-linear operations of a database query), the imperative-language query code can be executed by the DBMS more quickly and efficiently than the original declarative-language query code.

According to a first aspect of the innovations described herein, a query engine receives a first version of a database query including first query code in a declarative language (e.g., SQL). Based on the first query code, the query engine generates second query code in an imperative language (e.g., a scripting language). The query engine embeds the second query code in a second version of the database query. In particular, the first query code and the second query code can specify one or more non-linear operations for the database query. For example, the non-linear operation(s) are for determining a running minimum value, determining a running maximum value, determining a running count value, determining a running average value and/or determining a running sum value.

The second version of the database query can be an intermediate representation that specifies how to retrieve and transform data responsive to the database query. For example, the intermediate representation represents the database query as a graph including multiple nodes, where each of the nodes represents a transformation on data of a column-store database. The column-store database includes a table partitioned into columns, the table having rows for records of the table. One node can represent, for the second query code, an operation to be performed on a row-after-row basis for at least some of the rows of the table. Another node can represent an operation to be performed on a column-after-column basis for one or more of the columns of the table. The intermediate representation can be written in an extensible markup language, but has the second query code in the imperative language embedded therein.

The query engine can include a library of functions for converting elements in the declarative language (e.g., queries, statements, expressions) to elements in the imperative language (e.g., code blocks, statements). The query engine can be part of a client application, which passes the second version of the database query to a DBMS. Or, the query engine can be part of a DBMS. For example, the query engine is a query engine application executing in a Web application server associated with an in-memory column-store database server, which receives the first version of the database query from a client application. In this case, the query engine can pass the second version of the database query to an execution engine for execution, and receive results of the execution of the database query.

According to another aspect of the innovations described herein, a query engine receives a first version of a database query, which includes first query code in a declarative language (e.g., SQL). The first query code specifies one or more non-linear operations for the database query. For example, the non-linear operation(s) are for determining a running minimum value, determining a running maximum value, determining a running count value, determining a running average value and/or determining a running sum value. The query engine generates a second version of the database query. In doing so, the query engine identifies, within the first version of the database query, the first query code, and the query engine generates, based on the first query code, second query code in an imperative language (e.g., a scripting language). The query engine passes the second version of the database query to an execution engine for execution.

According to another aspect of the innovations described herein, a computer system with a processor and memory implements a database server. The database server includes a query engine and an execution engine. The query engine is configured to: (a) receive a first version of a database query including first query code in a declarative language (e.g., SQL); (b) based on the first query code, generate second query code in an imperative language (e.g., a scripting language); and (c) embed the second query code in a second version of the database query (e.g., an intermediate representation that specifies how to retrieve and transform data responsive to the database query). The execution engine is configured to: (a) receive the second version of the database query from the query engine; (b) execute the database query; and (c) return results of the execution of the database query.

More generally, the innovations for query processing can be implemented as part of a method, as part of a computer system adapted to perform the method or as part of a tangible computer-readable media storing computer-executable instructions for causing a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIGS. 7a and 7b are a code listing illustrating imperative-language query code for the example database query of FIGS. 6a and 6b.

FIGS. 8a and 8b are a code listing illustrating results of execution of the example database query of FIGS. 6a and 6b.

DETAILED DESCRIPTION

The detailed description presents innovations in the area of query processing for a database management system ("DBMS"). For example, for a database query, a query engine generates query code in an imperative language based on query code in a declarative language such as a structured query language ("SQL"). The query engine can be part of a DBMS or located with a client application. In particular, for non-linear operations of a database query, when the DBMS executes the database query, imperative-language query code can be executed more quickly and efficiently than the original declarative-language query code.

I. Introduction.

In many scenarios, data stored in a database can be accessed using a client application, which provides to a DBMS a database query written in a database query language such as SQL. SQL is a special-purpose language designed for manipulation of data managed by a DBMS. SQL is an example of a declarative language. A declarative language is a programming language that specifies what a computer program should accomplish, without specifying a sequence of steps or actions to accomplish that result. For example, a computer program in a declarative language describes what the program should accomplish in terms of the problem domain, rather than describing how to accomplish the result as a sequence of programming language primitives, steps, actions, etc. An appropriate sequence of primitives, steps, actions, etc. for the declarative-language program can later be generated automatically. Examples of declarative languages include database query languages such as variations of SQL and XQuery, as well as languages used in logic programming or functional programming.

A declarative language is different than an imperative language. An imperative language is a programming language that specifies a computer program as statements that change the program's state, using an explicit sequence of steps or actions. A procedural language is an imperative language in which a computer program is built from one or more procedures (also called functions, routines, sub-routines, methods, etc.). Variations of procedural languages (for structured programming or object-oriented programming) impose further constraints on how programs are specified. Examples of imperative languages include low-level machine code languages, early programming languages such as FORTRAN, COBOL, BASIC, Pascal and C, programming languages with support for features of object-oriented programming (such as C++, Smalltalk, Visual Basic, Visual C++ and Java), scripting languages such as Perl, Python, PHP, JavaScript and Ruby, and multi-paradigm languages such as VB.NET, C# and F#. An imperative language (especially a multi-paradigm language) can include or provide support for some aspects of a declarative language, but is primarily imperative. Similarly, a declarative language can include or provide support for some aspects of an imperative language, but is primarily declarative.

In general, a DBMS receives a database query, processes the database query using a query engine and execution engine, and returns results of the database query. In many implementations, a DBMS cannot directly process a database query in a declarative language. Instead, to process the database query, a query engine generates an intermediate representation of the database query, which specifies operations for retrieval and transformation of data responsive to the database query. An execution engine of the DBMS executes the intermediate representation of the database query. For example, the intermediate representation is a plan or scenario that models data retrieval and transformation operations (e.g., to join tables, to aggregate data, to select data). When it executes the plan or scenario, the execution engine determines results responsive to the database query.

For a column-store database, a database query can define an operation (a so-called linear operation) performed on one or more columns of data, on a column-after-column basis. In a database query, a linear operation can easily be specified in SQL. Further, the query engine can specify the linear operation in the intermediate representation in a way that sets up efficient execution. When the execution engine processes the intermediate representation, performing the linear operation is typically fast and efficient.

A database query can also define an operation (a so-called non-linear operation) performed on one or more rows of data, on a row-after-row basis. The non-linear operation can be determination of a running average value, running maximum value, running minimum value, running sum value, running count value or other value. For example, to calculate the running average value, the DBMS iterates across all rows of a column, returning the running average value after each row. Although a non-linear operation can easily be specified in SQL, straightforward conversion by the query engine into the intermediate representation yields operations that cause the DBMS to access records (rows) one at a time. When the execution engine of a DBMS executes the intermediate representation, the accessed records are returned, one at a time, to the query engine of the DBMS, which further processes the result set of the query according to the non-linear operation (e.g., calculating the running average value). This process can be slow and inefficient, compared to processing for linear operations.

According to innovations described herein, for a non-linear operation in a database query, a query engine can convert query code in SQL or another declarative language to query code in a scripting language or other imperative language. The imperative-language query code can be embedded in the intermediate representation. In this way, the non-linear operation can be conveyed to the execution engine from within the intermediate representation. The execution engine, even if it cannot directly execute declarative-language query code, can execute the imperative-language query code. Pushing the performance of the non-linear operation to the execution engine in this way typically makes overall query execution faster and more efficient. Instead of returning records one at a time to the query engine for further processing according to the non-linear operation, the execution engine can return a value calculated according to the non-linear operation.

II. Example Computer Systems and Cloud Computing Environments.

Figure 1:
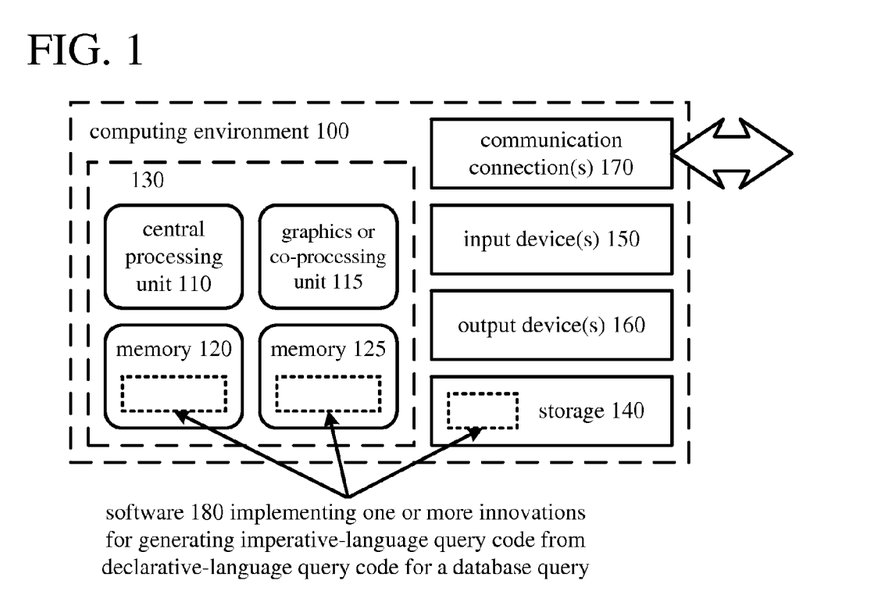
FIG. 1 is a diagram illustrating an example computer system in which some described embodiments can be implemented.

FIG. 1 depicts a generalized example of a suitable computer system (100) in which the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). In FIG. 1, this basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for generation of imperative-language query code based on declarative-language query code for a database query, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic storage media, optical storage media, or any other medium which can be used to store information in a non-transitory way and which can be accessed within the computer system (100). The storage (140) stores instructions for the software (180) implementing one or more innovations for generation of imperative-language query code based on declarative-language query code for a database query.

The input device(s) (150) may be a touch input device such as a keyboard, mouse, pen, or trackball, a voice input device, a scanning device, or another device that provides input to the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 2:
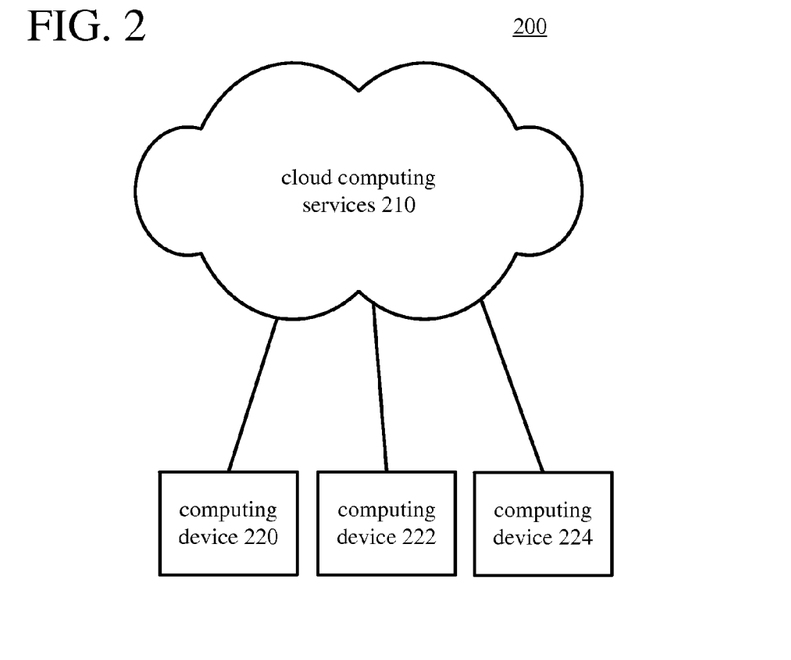
FIG. 2 is a diagram illustrating an example cloud computing environment in which some described embodiments can be implemented.

FIG. 2 depicts an example cloud computing environment (200) in which described innovations can be implemented. The cloud computing environment (200) includes cloud computing services (210). The cloud computing services (210) can include various types of cloud computing resources, such as computer servers that implement DBMSs, data storage repositories, networking resources, etc. The cloud computing services (210) can be centrally located (e.g., provided by a data center of a business or organization) or distributed (e.g., provided by various computing resources located at different locations, such as different data centers and/or located in different cities or countries).

The cloud computing services (210) are utilized by various types of computing devices (e.g., client computing devices), such as computing devices (220, 222, and 224). For example, the computing devices (e.g., 220, 222, and 224) can be computers (e.g., desktop or laptop computers), mobile devices (e.g., tablet computers or smartphones), or other types of computing devices. For example, the computing devices (e.g., 220, 222, and 224) can utilize the cloud computing services (210) to perform computing operations (e.g., query processing by a DBMS, data storage, and the like).

The terms "system" and "device" are used interchangeably herein. Unless the context clearly indicates otherwise, neither term implies any limitation on a type of computer system or computing device. In general, a computer system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computer system. These terms are high-level abstractions for operations performed by a computer system, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smartphones or other mobile devices that include computing hardware). The computer-executable instructions may be interpreted instructions, which are converted to another form of instructions at runtime, or instructions directly executable by a processor. Computer-readable storage media are any available tangible media that can be accessed within a computing environment (e.g., one or more optical media discs, volatile memory components (such as DRAM or SRAM), or nonvolatile memory components (such as flash memory or hard drives)). By way of example and with reference to FIG. 1, computer-readable storage media include memory (120 and 125) and storage (140). The term computer-readable storage media does not include signals and carrier waves. In addition, the term computer-readable storage media does not include communication connections (e.g., 170).

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, or any other suitable programming language. Database queries can be written in SQL or another database query language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

III. Example Network Environments for Query Processing.

Figure 3:
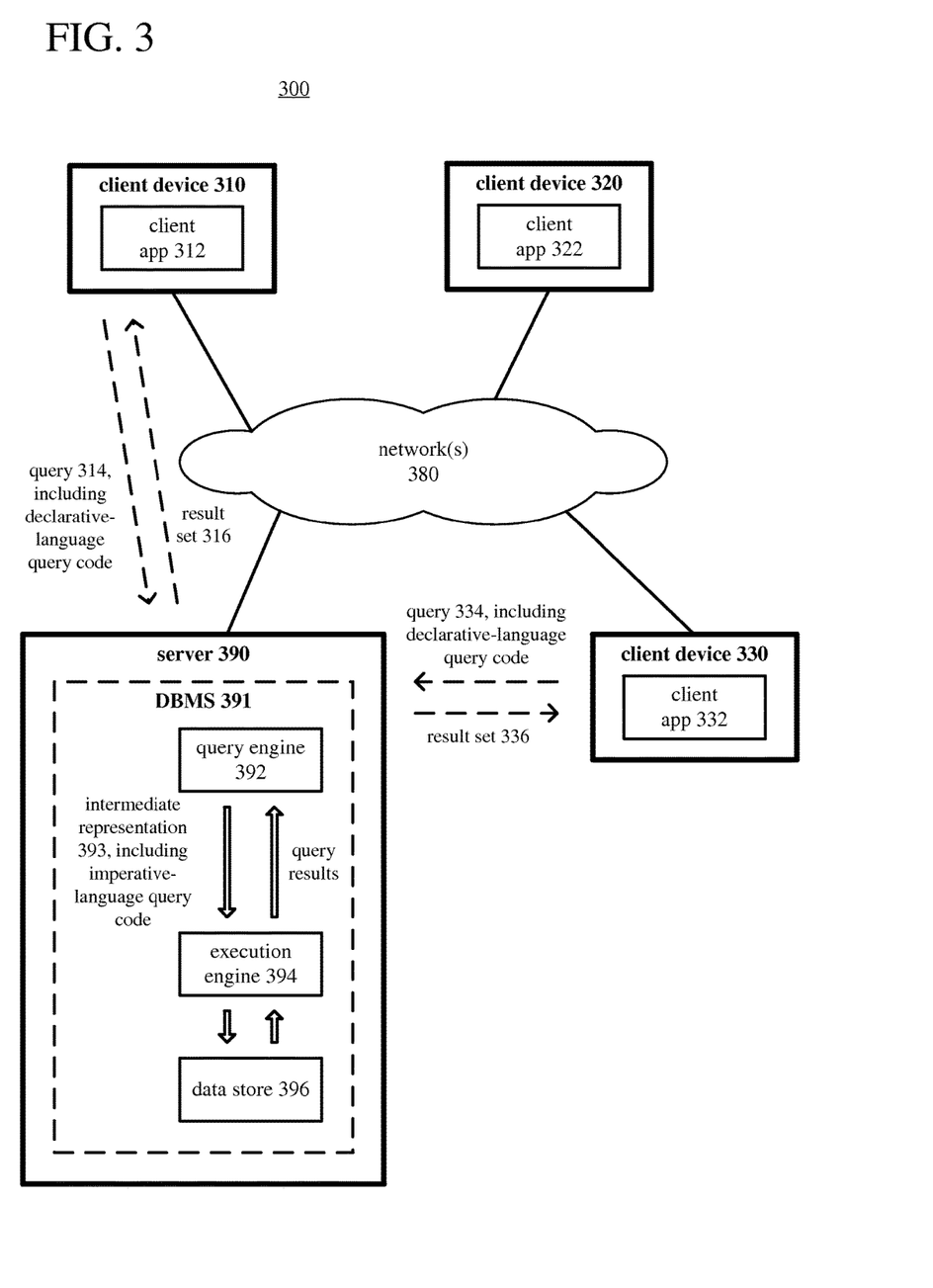
FIG. 3 is a diagram illustrating an example network environment that includes a server and client devices that interact for query processing.

FIG. 3 illustrates an example network environment (300) that includes a server (390), three client devices (310, 320, 330) and a network (380). The network (380) represents the Internet, a wide-area network, a local-area network or any other network. In FIG. 3, the server (390) interacts with the three client devices (310, 320, 330) over the network (380) for query processing.

The server (390) hosts a database management system ("DBMS") (391). The DBMS (391) mediates interactions between a database and clients in order to organize, create, update, capture, analyze and otherwise manage the data in a database. The DBMS (391) can be a relational DBMS ("RDBMS") such as a SAP HANA RDBMS, another in-memory RDBMS, a Postgres DBMS, another object-relational DBMS or some other type of DBMS. (To speed up operations that read data from a column-store database, a DBMS can keep column data in main memory. An in-memory database keeps data in main memory, with backups of the data stored in storage (e.g., disk storage). For example, an in-memory column-store database keeps column data in memory.) Although FIG. 3 shows a single server (390), in practice the DBMS (391) can manage multiple servers across which data for a database is partitioned.

Each of the client devices (310, 320, 330) includes a client application (312, 322, 332). A client application (312, 322, 332) can present a view of data stored in the database managed by the DBMS (391) or another DBMS. For example, the client application (312, 322, 332) can present a visualization of selected data and/or measures calculated for the selected data. A client application (312, 322, 332) can also provide features for creating, deleting, editing or otherwise managing data in the database. Although FIG. 3 shows three client devices (310, 320, 330), alternatively, the network environment (300) can include more or fewer client devices.

A client application (312, 322, 332) transforms user input from an analyst into one or more database queries issued to the DBMS (391), which are conveyed through the network (380). A database query can be entirely or partially written in SQL, another database query language, or some other declarative language. In the example of FIG. 3, a client application (312, 332) issues a database query (314, 334) through the network (380) to the DBMS (391), which processes the database query and returns a result set (316, 336) through the network (380) to the client application (312, 332) that issued the database query (314, 334).

The DBMS (391) includes a query engine (392), execution engine (394) and data store (396). The query engine (392) can be a query engine application that executes in a Web application server such as an XS server in an SAP HANA RDBMS. Or, the query engine (392) can be an application that runs in a Web browser at a client device (310, 320, 330). Or, the query engine (392) can be some other software running at a client device or Server.

Memory accessible to the query engine (392) buffers the database query (314, 334), which includes declarative-language query code. The query engine (392) receives the database query (314, 334) and processes it. In particular, at runtime, the query engine (392) can translate at least part of the database query (314, 334), producing an intermediate representation (393) of the database query (314, 334). The intermediate representation (393) can include imperative-language query code. Memory accessible to the query engine (392) buffers the intermediate representation (393) of the database query (314, 334) for output.

In particular, suppose a client application (312, 332) seeks selected data as well as measures calculated for the selected data in order to present a view of the data. One of the operations performed to calculate the measures may be a non-linear operation (e.g., to calculate a running minimum value, running maximum value, running count value, running average value or running sum value). In the database query (314, 334), query code for a non-linear operation is written in SQL or another declarative language. On the fly, based on the declarative-language query code for the non-linear operation, the query engine (392) at runtime can create imperative-language query code for the non-linear operation, which can be executed efficiently.

The query engine (392) implements a framework for dynamically producing query code in an imperative language (e.g., a procedural, scripting language) based on the layout of query code in a declarative language (e.g., a database query language). The query engine (392) translates declarative-language query code to imperative-language query code. For this purpose, the query engine (392) can incorporate a library that includes functions to generate elements in the imperative language (e.g., to create syntactically correct statements in the imperative language, to create a program block in the imperative language). The library can also include functions to create operators for assignment, addition, division, comparison and other operations. The functions can be nested to create arbitrarily complex statements in the imperative language, based on elements of the declarative-language query code (e.g., queries, statements, expressions). In particular, as the query engine (392) traverses hierarchically organized elements of the declarative-language query code (parent and child elements such as queries, statements, etc.), the functions of the library can be called to create imperative-language query code for a non-linear operation for measuring a running sum, running count, running minimum, running maximum, or running average value. The imperative-language query code is embedded in an intermediate representation (393) for the database query.

The intermediate representation (393) includes operations to retrieve and transform data responsive to the database query. The intermediate representation can be a calculation scenario generated by the query engine (392) in extensible markup language ("XML") or another language. A calculation scenario describes a data flow in an acyclic graph, where each node in the graph represents a transformation to data. A transformation can involve, for example, aggregation of data, projection (selection of a subset) of data, joining multiple tables, or creation of a new column based on one or more existing columns. When the query engine (392) has translated declarative-language query code for a non-linear operation into imperative-language query code, which is embedded in the calculation scenario, one of the nodes of the graph can represent the imperative-language query code for the non-linear operation.

The execution engine (394) receives the intermediate representation (393) of the database query (314, 334) and executes it. The execution engine (394) is, for example, one or more components of a generic query processing engine for a SAP HANA RDBMS or other DBMS. According to the terms of the intermediate representation (393), the execution engine (394) requests specific data from the data store (396). The data store (396) provides the requested data to the execution engine (394), which can perform various transformations on the data. Thus, the imperative-language query code generated by the query engine (392) can be executed in the execution engine (394) as part of the intermediate representation (393). The execution engine (394) returns the query results. The DBMS (391) can format the returned data as the query result set (316, 336), which is output to the client application (312, 332).

Depending on implementation, a query engine, execution engine and client application can be hosted in different configurations of computer systems. Communication of a database query, intermediate representation or query result set over a network can use a remote procedure call to a procedure of an interface, remote messaging, or some other form of communication across a network. Communication of a database query, intermediate representation or query result set within a computer system can use inter-process communication, method calls across an interface or any other form of communication within the computer system.

Within a computer system, a database query, intermediate representation or query result set can be passed by value or passed by reference.

For example, a client device can host both a client application and the query engine. In this case, the initial database query is communicated from the client application to the query engine using some form of communication within the client device. The query engine communicates the intermediate representation of the database query to the execution engine of the DBMS over a network, and the query result set is returned over a network. Alternatively, a single application or other software program can incorporate the client application and the query engine, directly performing the query conversion to produce the intermediate representation.

Or, as another example, a server can host both the query engine and the execution engine. In this case, the initial database query is communicated from a client application to the query engine over a network. The query engine communicates the intermediate representation to the execution engine using some form of communication within the server. The query result set is returned to the client application over a network. Alternatively, a single application or other software program can incorporate the query engine and the execution engine.

Or, as another example, a client application, query engine and execution engine can be hosted by different computer systems. In this case, the initial database query is communicated from the client application to the query engine over a network. The query engine communicates the intermediate representation to the execution engine over a network, and the query result set is returned over a network.

IV. Example Techniques for Generation and Execution of Imperative-Language Query Code.

Figure 4:
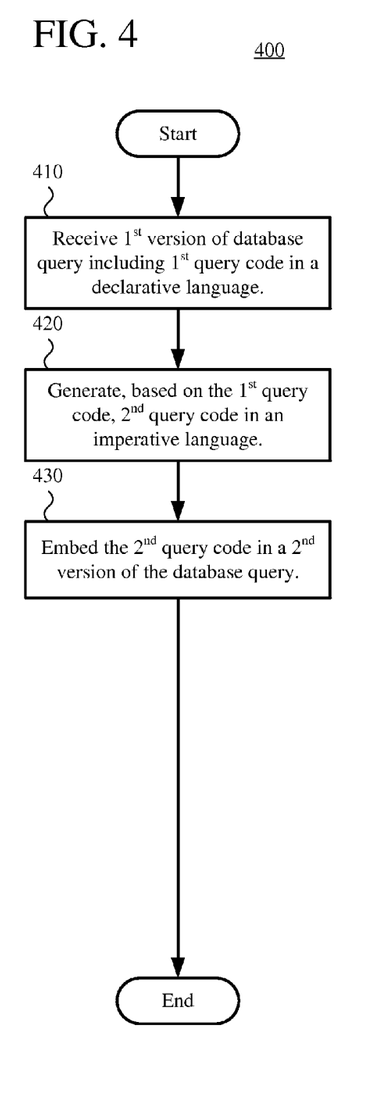
FIG. 4 is a flowchart illustrating a generalized technique for generating imperative-language query code based on declarative-language query code for a database query.

FIG. 4 is a flowchart illustrating a generalized technique (400) for generation of imperative-language query code based on declarative-language query code for a database query. A query engine such as one described with reference to FIG. 3 can perform the technique (300). The query engine can be a query engine application executing in a Web application server associated with an in-memory column-store database server. Or, the query engine can be some other type of query processing tool.

To start, the query engine receives (410) a first version of a database query, which includes first query code in a declarative language (e.g., SQL or another database query language). For example, the query engine receives (410) the first version of the database query from a client application. The first version of the database query can entirely or partially in the declarative language. The first version of the database query can include query code for one or more linear operations as well as query code for one or more non-linear operations (such as determining a running minimum value, determining a running maximum value, determining a running count value, determining a running average value and/or determining a running sum value). In particular, in the example shown in FIG. 4, the first query code in the declarative language specifies one or more non-linear operations for the database query.

The query engine generates a second version of the database query. In doing so, the query engine identifies, within the first version of the database query, any query code that specifies linear operations, which is not translated into an imperative language. The query engine also identifies, within the first version of the database query, any query code that specifies non-linear operations, which is translated into an imperative language (e.g., a scripting language or other procedural language).

In FIG. 4, based on the first query code in the declarative language, the query engine generates (420) second query code in an imperative language. When the first query code in the declarative language specifies one or more non-linear operations for the database query, the second query code in the imperative language also specifies one or more non-linear operations for the database query. The query engine can include a library of functions for converting elements in the declarative language (e.g., queries, statements, expressions) to elements in the imperative language (e.g., code blocks, statements). The query engine embeds (430) the second query code in the second version of the database query.

The second version of the database query can be an intermediate representation that specifies how to retrieve and transform data responsive to the database query. The intermediate representation can be written in an extensible markup language or other language, but have the second query code (in the imperative language) embedded therein. For example, the intermediate representation is a calculation scenario or plan that represents the database query as a graph including multiple nodes, where each of the nodes represents a transformation on data of a column-store database. The column-store database includes a table partitioned into columns, where the table has rows for records of the table. One of the nodes can represent, for the second query code, a non-linear operation to be performed on a row-after-row basis for at least some of the multiple rows of the table. Another node can represent a linear operation to be performed on a column-after-column basis for one or more of the columns of the table. Alternatively, the intermediate representation can use another format.

The query engine can pass the second version of the database query to an execution engine for execution. The execution engine can execute the database query as described with reference to FIG. 5.

Figure 5:
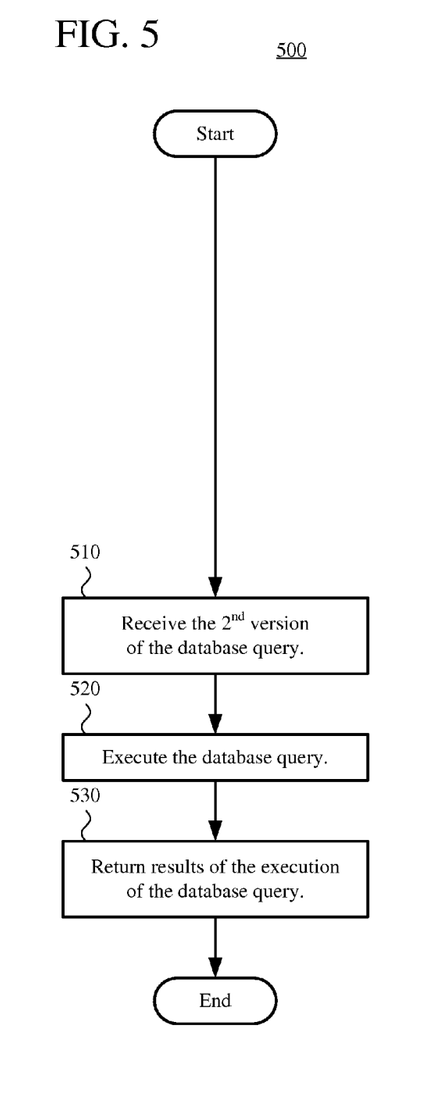
FIG. 5 is a flowchart illustrating a generalized technique for executing the database query including the imperative-language query code.

FIG. 5 is a flowchart illustrating a generalized technique (500) for execution of imperative-language query code for a database query. An execution engine such as one described with reference to FIG. 3 can perform the technique (300). The execution engine can be one or more components of a generic query processing engine for a SAP HANA RDBMS or other DBMS. The execution engine receives (510) the second version of the database query from the query engine. The execution engine executes (520) the database query and returns (530) results of the execution of the database query. The query engine can receive the results of the execution of the database query. Or, the results of the execution of the database query can bypass the query engine, and be returned directly to a client application.

V. Examples of Query Code Conversion for Non-Linear Operations.

This section describes examples of dynamic conversion of query code in a declarative language (BI query, which is a database query language) to query code in an imperative language (L, which is a procedural, scripting language). In some example implementations, after a query engine converts declarative-language query code for non-linear operations to imperative-language query code, an execution engine can directly execute the imperative-language query code for the non-linear operations, making query processing faster and more efficient.

Figure 6A:
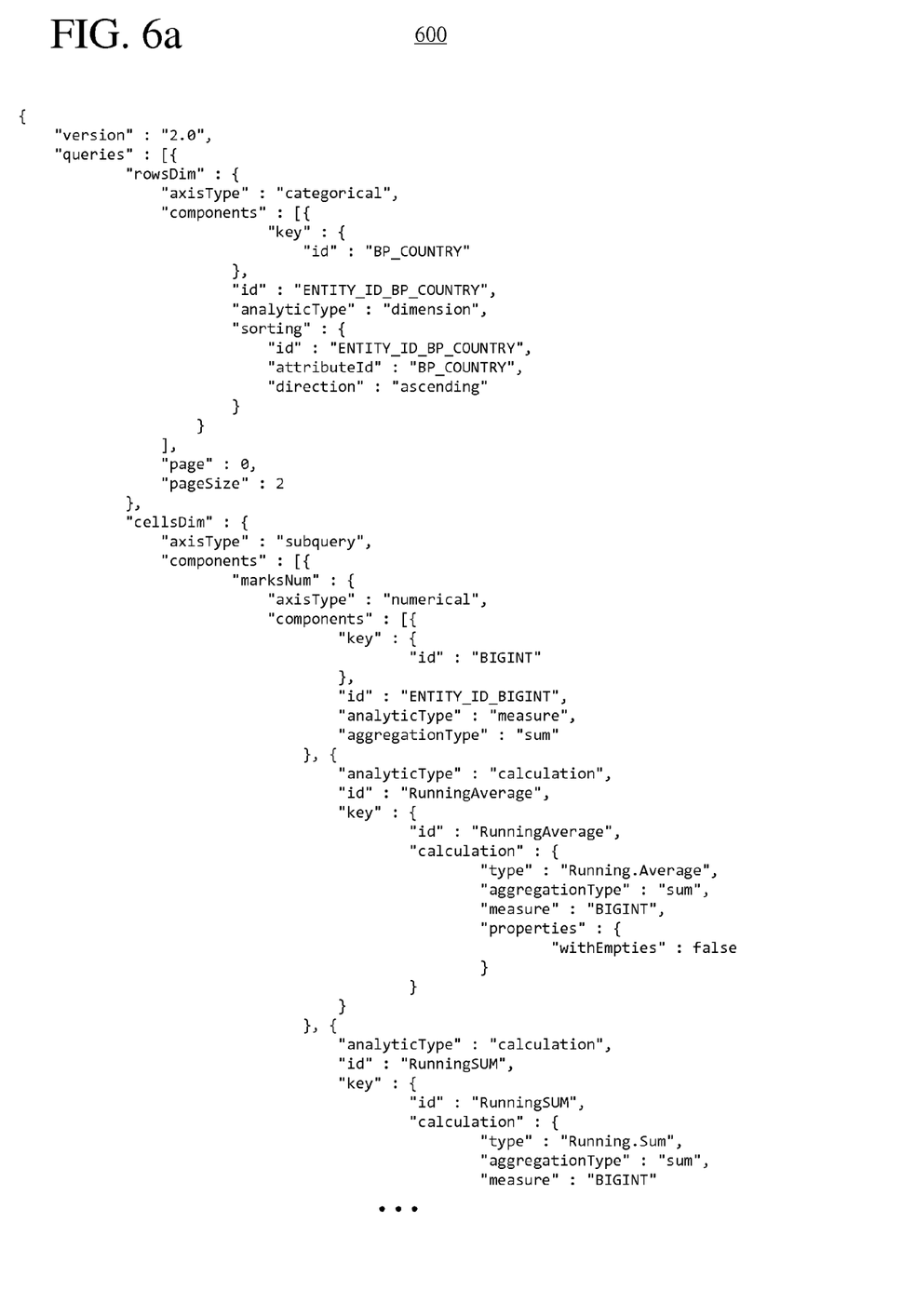
FIGS. 6a and 6b are a code listing illustrating an example database query, including query code in a declarative language for a running average query and running sum query.
Figure 6B:
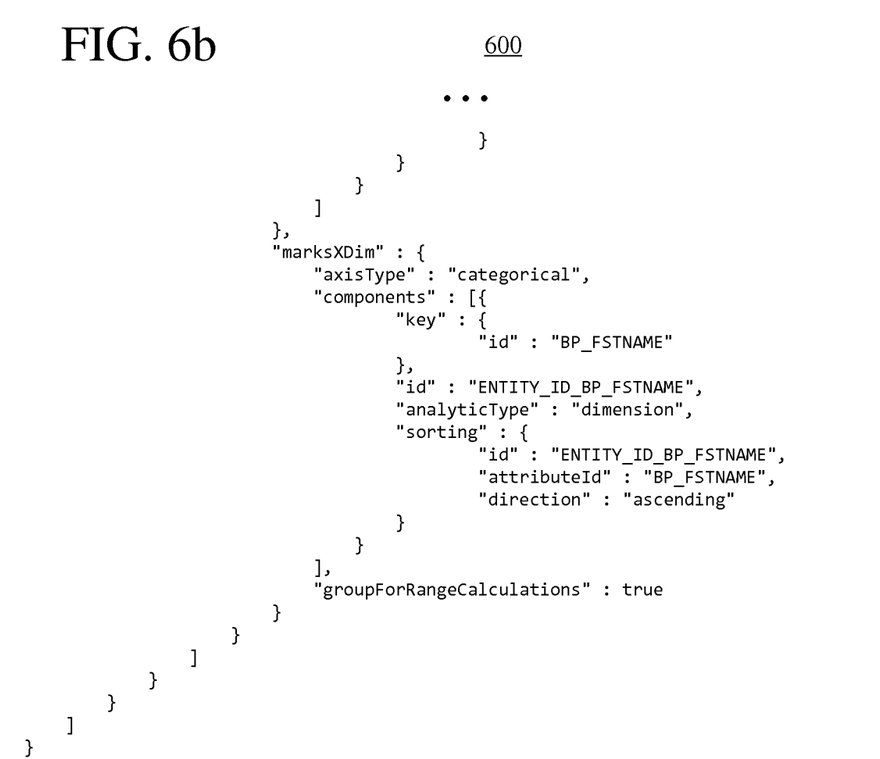

FIGS. 6a and 6b show a code listing (600) for an example database query. The example database query includes declarative-language query code for sum, running average, and running sum operations. The database query is a multi-dimensional query. The database query specifies the calculation of measures for the sum, running average and running sum of BIGINT values per first name (BP_FSTNAME) within individual countries/regions (BP_COUNTRY). That is, for a given country or region (BP_COUNTRY), measures for sum, running average and running sum are calculated per first name (BP_FSTNAME). The cumulative totals for running average and running sum are reset at the beginning of each new country/region.

Appendix 1 includes a code listing for an example conversion routine CreatesLProcedure.js in some example implementations. The conversion routine translates declarative-language query code to imperative-language query code. The conversion routine imports a library "sap.bi.va­.vxtab.logic.lib.llang" that includes various functions. The conversion routine uses some functions of the library (e.g., Lang.Statements.Block, Lang.Statments.Statement) to generate program elements in the imperative language. For example, the conversion routine can use the function Lang­.Statements.Statement to create a syntactically correct statement in the imperative language, and it can use the function Lang.Statments.Block to create a code block in the imperative language. The conversion routine uses other functions of the library to create operators for assignment, addition, division, comparison and other operations. For example, the conversion routine can use the function Lang.Expressions.Assignment to create an assignment operator in the imperative language. The functions can be nested to create arbitrarily complex statements in the imperative language. In the conversion routine, the function defineCalculationLogic( ) can be called to generate imperative-language query code for calculation of various types of non-linear operations, including running sum (to increment the value of a variable by a given amount for a group), running count (to increment a running count value for a group), running minimum (to determine a running minimum value in a group), running maximum (to determine a running maximum value in a group), and running average (to determine a running average value in a group). The function defineCalculationLogic( ) can be called as the conversion routine traverses hierarchically organized elements of the declarative-language query code (parent and child elements such as queries, statements, expressions, etc.).

In Appendix 1, the conversion routine CreatesLProcedure.js is JavaScript code that can be executed in a Web application server for a DBMS. For example, the Web application server is an XS server in an SAP HANA RDBMS. Alternatively, the conversion routine can be executed in a Web browser. Or, the conversion routine can be written in a language other than JavaScript (e.g., Java).

The conversion routine shown in Appendix 1 generates imperative-language query code line-by-line. The imperative-language query code is embedded in a calculation scenario. The imperative-language query code can then be executed in the execution engine as part of the calculation scenario.

Appendix 2 includes a code listing for an example calculation scenario CalculationScenario.xml, which includes imperative-language query code created by the conversion routine for the example database query shown in FIGS. 6a and 6b. The calculation scenario is an example of an intermediate representation. The calculation scenario is XML code that can be executed in an execution engine for a DBMS such as an SAP HANA RDBMS. Alternatively, the calculation scenario can be written in another language.

Figure 7B:
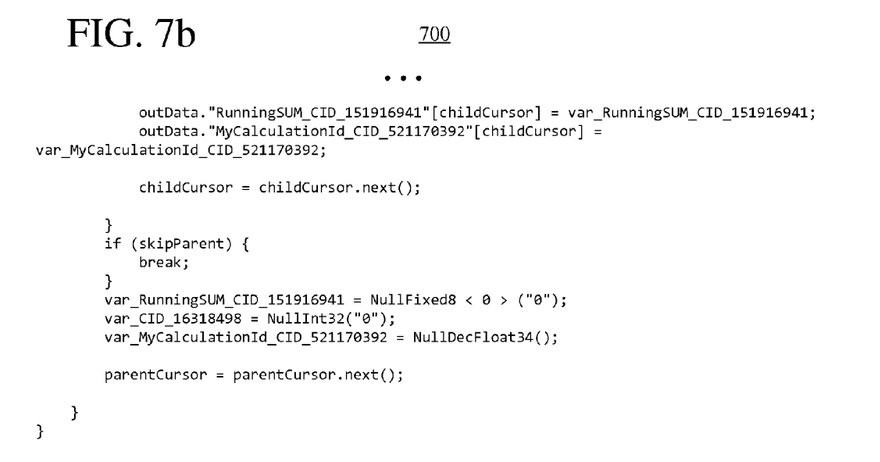

The calculation scenario specifies a view of measurements, values, etc. of the database that are requested in the database query (that is, to calculate measures for the sum, running average and running sum of BIGINT values per first name (BP_FSTNAME) within individual countries/regions (BP_COUNTRY)). For the view, the calculation scenario specifies calculations at nodes of a graph, which the execution engine can perform to determine the measurements, values, etc. responsive to the database query. For one of the nodes of the graph, the calculation scenario includes imperative-language query code that is automatically generated by the conversion routine for non-linear operations. The imperative-language query code is embedded in a "script" element of the XML calculation scenario. As described below, FIGS. 7a and 7b illustrate the imperative-language query code in the calculation scenario. The calculation scenario also includes code for other nodes, e.g.:
  a "customL" node to determine inputs and export attributes;
  an "aggregation" node to determine minimum and maximum values for each calculated measurement responsive to the query; the minimum and maximum values can be used to set the scale of graphing or other visualization of the query results;
  a "projection" node to determine the range of values for each calculated measurement, which can be used to set parameters for visualization of the query results;
  other nodes to determine values used in graphing and display processes;
  a node that limits the number of returned records to a threshold count; and
  a union node that determines the union of results from various nodes of interest.

FIGS. 7a and 7b show a code listing (700) for imperative-language query code, which is created by the conversion routine for the example database query of FIGS. 6a and 6b. The code listing (700) is written in the L scripting language. Alternatively, the imperative-language query code can be written in another imperative language.

The imperative-language query code includes operations to compute the running sum value and running average value of BIGINT values per first name (BP_FSTNAME) within individual countries/regions (BP_COUNTRY). The imperative-language query code reads records one-by-one, and calculates the measurements specified in the database query. The data values are sorted by country/region. The function IsContextMatch( ) checks if calculations of the running average value and running sum value should be reset because the context has changed (that is, the country/region has switched).

Figure 8B:
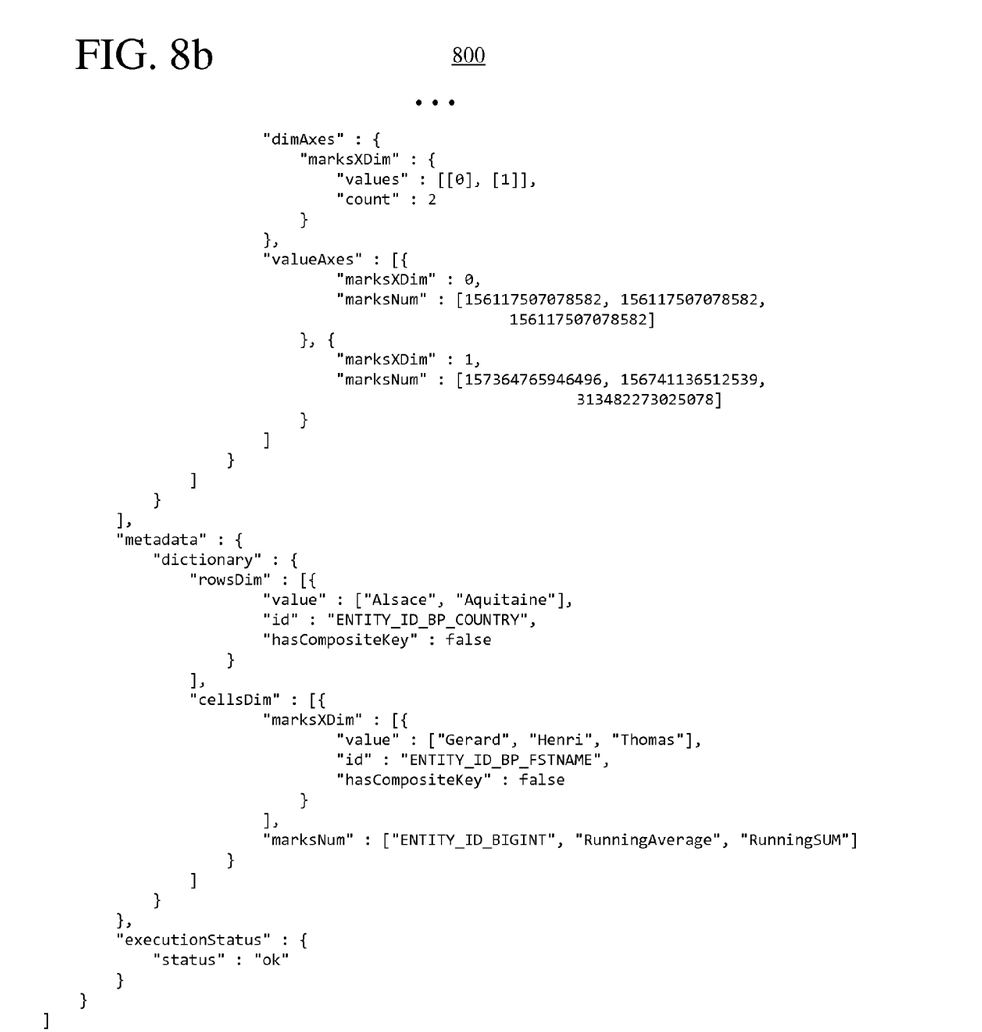

FIGS. 8a and 8b show a code listing (800) illustrating results of execution of the example database query of FIGS. 6a and 6b. The code listing (800) specifies the minimum and maximum values for the sum, running average and running sum measurements. The code listing (800) also specifies the values for the sum, running average and running sum measurements per first name (BP_FSTNAME) within individual countries/regions (BP_COUNTRY)), which are summarized in the following table.

| country/region | first name | sum of BIGINT | running average | running sum |
|---|---|---|---|---|
| Alsace | Thomas | 139914937450662 | 139914937450662 | 139914937450662 |
| Aquitaine | Gerard | 156117507078582 | 156117507078582 | 156117507078582 |
| Aquitaine | Henri | 157364765946496 | 156741136512539 | 313482273025078 |

In this table, the "sum of BIGINT" column includes the sum of BIGINT values for each given first name in each given country/region. The "running average" column includes the running average for "sum of BIGINT" within a given country/region. For example, for Aquitaine, the running average after the first name Henri is the average of the "sum of BIGINT" values for the first names Gerard and Henri in Aquitaine. The "running sum" column includes the running sum for "sum of BIGINT" within a given country/region. For example, for Aquitaine, the running sum after the first name Henri is the sum of the "sum of BIGINT" values for the first names Gerard and Henri in Aquitaine. FIGS. 6a-6b, 7a-7b and 8b-8b illustrate a simplified example with a small table of data values. Real world examples typically involve much larger tables of data values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. One or more computer-readable storage media storing computer-executable instructions for causing a computer system when programmed thereby to perform:
   receiving, at a query engine, a request comprising a first version of a database query including first query code in a declarative language, the database query specifying a plurality of database operations, the plurality of database operations comprising at least one linear operation and at least one non-linear operation;
   with the query engine, based on the first query code, generating second query code for the at least one non-linear operation in an imperative language;
   with the query engine, embedding the second query code in a second version of the database query, the second version of the database query comprising the at least one linear operation specified in the declarative language and the at least one non-linear operation in the imperative language code;
   with an execution engine of a database management system, generating an intermediate representation of the at least one linear operation specified in a declarative language, the intermediate representation specifying one or more operations for retrieving information from one or more database records;
   with the execution engine, executing the intermediate representation and directly executing the imperative language code for the at least one non-linear operation, wherein the execution engine retrieves information from one or more database records as specified by the intermediate representation and performs one or more calculations on the retrieved data as specified by the at least one non-linear operation; and
   with the execution engine, returning execution results in response to the request.

2. The one or more computer-readable storage media of claim 1, wherein the declarative language is a structured query language, and wherein the imperative language is a scripting language.

3. The one or more computer-readable storage media of claim 1, wherein the second version of the database query is an intermediate representation that specifies how to retrieve and transform data responsive to the database query.

4. The one or more computer-readable storage media of claim 3, wherein the intermediate representation represents the database query as a graph including multiple nodes, each of the multiple nodes representing a transformation on data of a column-store database, wherein the at least one linear operation forms a node of the graph.

5. The one or more computer-readable storage media of claim 4, wherein the column-store database includes a table partitioned into columns, the table having multiple rows for records of the table, wherein a first node of the multiple nodes represents, for the second query code, a transformation to be performed on a row-after-row basis for at least some of the multiple rows of the table, and wherein a second node of the multiple nodes represents a transformation to be performed on a column-after-column basis for one or more of the columns of the table.

6. The one or more computer-readable storage media of claim 3, wherein the intermediate representation is written in an extensible markup language file but has the second query code in the imperative language embedded therein.

7. The one or more computer-readable storage media of claim 1, wherein the at least one non-linear operation is selected from the group consisting of determining a running minimum value, determining a running maximum value, determining a running count value, determining a running average value and determining a running sum value.

8. The one or more computer-readable storage media of claim 1, wherein the query engine includes a library of functions for converting elements in the declarative language to elements in the imperative language, and wherein the elements in the imperative language include code blocks and statements.

9. The one or more computer-readable storage media of claim 1, wherein the query engine is a query engine application executing in a Web application server associated with an in-memory column-store database server, and wherein the first version of the database query is received from a client application.

10. The one or more computer-readable storage media of claim 9, further storing computer-executable instructions for causing the computer system when programmed thereby to perform:
   with the query engine, passing the second version of the database query to an execution engine for execution; and
   receiving, at the query engine, results of the execution of the database query.

11. A method comprising:
   with an execution engine of a database management system, receiving from a query engine a second version of a database query, the second version of the database query comprising a plurality of nodes, at least a first node comprising at least one non-linear operation specified in an imperative language and at least a second node comprising at least one linear operation specified in a declarative language according to a first version of the database query, wherein the first version of the database query comprised the at least one non-linear operation specified in a declarative language;

with the execution engine, traversing the plurality of nodes of the second version of the database query, the traversing comprising:

with the execution engine, for the at least a first node, generating an intermediate representation of the at least one linear operation specified in a declarative language, the intermediate representation specifying one or more operations for retrieving information from one or more database records;

with the execution engine, for the at least a second node, executing the intermediate representation and directly executing the imperative language code for the at least one non-linear operation, wherein the execution engine retrieves information from one or more database records as specified by the intermediate representation and performs one or more calculations on the retrieved data as specified by the at least one non-linear operation; and with the execution engine, returning execution results in response to the request.

12. The method of claim 11, wherein the declarative language is a structured query language, and wherein the imperative language is a scripting language.

13. The method of claim 11, wherein the second version of the database query specifies how to retrieve and transform data responsive to the database query, and wherein the second version of the database query represents the database query as a graph including the plurality of nodes, each of the plurality of nodes representing an operation on data of a column-store database.

14. The method of claim 13, wherein the column-store database includes a table partitioned into columns, the table having multiple rows for records of the table, wherein a first node of the plurality of nodes represents, for the second query code, an operation to be performed on a row-after-row basis for at least some of the multiple rows of the table, and wherein a second node of the multiple nodes represents an operation to be performed on a column-after-column basis for one or more of the columns of the table.

15. The method of claim 11, wherein the at least one non-linear operation is selected from the group consisting of determining a running minimum value, determining a running maximum value, determining a running count value, determining a running average value and determining a running sum value.

16. A computer system including a processor and memory, wherein the computer system implements a database server comprising one or more processors and at least one memory, the database server configured to carry out operations comprising:

receiving a first version of a database query including first query code in a declarative database query language, the first query code specifying at least first and second database operations;

from the first query code, generating a second query code in an imperative language for the second database operation;

embedding the second query code in a second version of the database query, the second version of the database query comprising a first parsable element for the declarative database query language code for the first database operation and a second parsable element comprising the imperative language code for the second database operation;

executing the database query based on the second version of the database query at an execution engine of a database management system of the database server, the executing comprising:

parsing the first parsable element of the second version of the database query and converting the first parsable element to an intermediate representation specifying one or more operations for retrieving information from one or more database records; and parsing the second parsable element of the second version of the database query and directly executing the imperative language code for the second database operation;

returning results of the execution of the database query.

17. The computer system of claim 16, wherein the declarative language is a structured query language, wherein the imperative language is a scripting language, and wherein the second version of the database query specifies how to retrieve and transform data responsive to the database query.

18. The computer system of claim 16, wherein generating the second query code in an imperative query language comprises calling at least one function of a library of functions for converting elements in the declarative language to elements in the imperative language, and wherein the elements in the imperative language include code blocks and statements.

19. The computer system of claim 16, wherein the database server operates an application executing in a Web application server, wherein the first version of the database query is received from a client application, and wherein the database server is an in-memory column-store database server.

20. The computer system of claim 16, wherein the second version of the database query comprises at least one linear database operation specified in the declarative database query language and at least one non-linear database operation specified in the imperative language.

* * * * *